Sept. 22, 1942.    J. K. MacKINNON    2,296,561
METHOD FOR MAKING COMPOSITE PIPE STRUCTURES
Filed Sept. 29, 1941
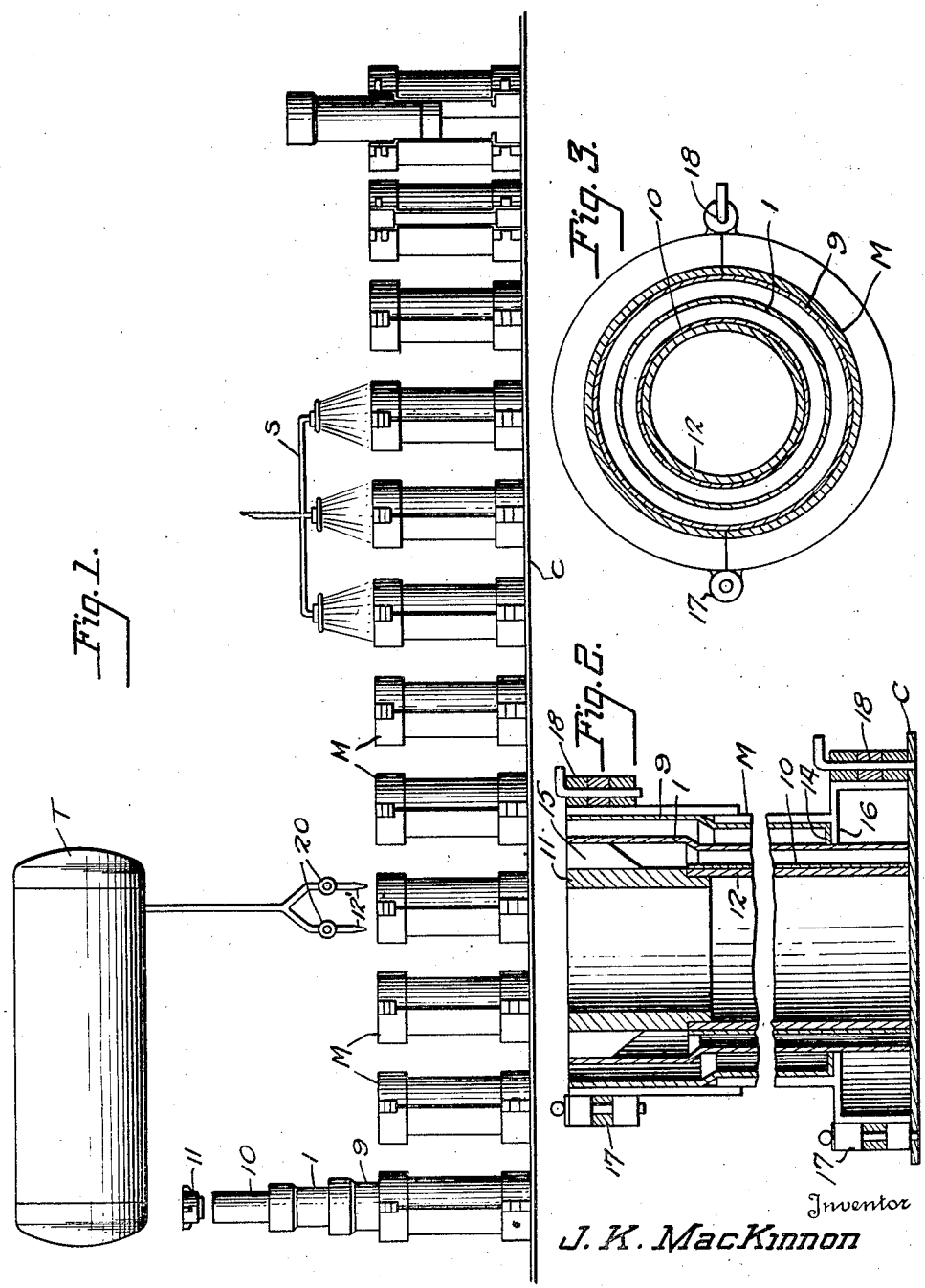
Inventor
J. K. MacKinnon
By Mason Fenwick & Lawrence
Attorneys Patented Sept. 22, 1942

2,296,561

UNITED STATES PATENT OFFICE 2,296,561

METHOD FOR MAKING COMPOSITE PIPE STRUCTURES

John K. MacKinnon, Mount Pleasant, Tex., assignor to Talco Asphalt & Refining Company, Mount Pleasant, Tex.

Application September 29, 1941, Serial No. 412,909

1 Claim. (Cl. 25—154)

This invention relates to an improved method for making composite pipe structures and more particularly pipe structures as more fully described in my co-pending application Serial No. 384,178, filed March 19, 1941, of which application this is a continuation-in-part.

The method is directed to the formation of a composite pipe structure in which a metallic core is provided with both interior and exterior layers of asphaltum or other similar material and in which the interior core provides the essential strength for the pipe section while the inner and outer asphaltum layers constitute sufficient protection from the effects of fluids carried through the pipe or moisture in the ground in which the pipe may be laid.

The invention consists in the novel method of constructing such composite pipes.

One sheet of drawings accompanies this specification, in which:

Figure 1 shows a general lay-out of apparatus for carrying out the improved method;

Figure 2 is a cross sectional view through a mold unit; and

Figure 3 is a top plan view of a mold unit.

In accordance with the present invention, molds M are provided, each formed preferably of two sections hinged as at 17 and provided with latches 18, by means of which they can be secured together. Each mold is adapted to receive the metallic core 1 which is to be embodied in the finished pipe structure.

Adjacent the bottom of the mold sections are inwardly directed annular flanges 16 adapted to engage the lower end of the core 1 and position this core centrally of the mold and spaced from the outer walls thereof. Each mold also includes a tubular core 12 which together with the mold proper seats on a conveyor C. Two paper cylinders 9 and 10 are placed within the mold, the larger paper cylinder 9 fitting closely against the inner faces of the main mold walls with its bottom end inturned as at 14 to overlay the annular flanges 16. The smaller paper cylinder 10 fits snugly around the outer face of the mold core 12.

A tubular plug 11 seats over the upper end of the mold core 12 and is provided with radially disposed lugs 15 adapted to contact the inner face of the upper end of the pipe core 1 to center and steady this core in spaced relationship to the plug 11 and the mold walls.

A plurality of molds such as previously described are mounted upon an endless conveyor C as illustrated in Figure 1, and are advanced by successive steps under a container T holding heated asphaltum material, which container is provided with downwardly directed nozzles 12', each controlled as by a valve 20 and so spaced as to supply streams of the asphaltum to the spaces on either side of the pipe core 1 within a mold stopped immediately beneath the nozzles. Any desired number of these nozzles may be used to expedite the delivery of the molten asphaltum rapidly to each mold and the valves may be controlled manually or automatically as may be desired.

Beyond the nozzles 12' in the direction of travel of the conveyor C is positioned a sprinkler system S through which cold water can be sprayed over the molds to cool the asphaltum contents.

By means of the method thus described, it will be apparent that composite pipe units each comprising an interior metallic core embedded in an outer and inner layer of asphaltum may be rapidly and efficiently produced.

The paper tubes or cylinders used in connection with the molding process may be impregnated or coated with any suitable material to render the same non-adhesive with respect to the asphaltum so that after the molding process, these paper cylinders can be readily removed from the pipe as desired.

Having thus fully described my invention, what I claim is:

The method of coating a metal pipe core inside and out with a thermo-plastic nonmetallic protective layer, comprising, arranging a cylindrical metallic pipe core vertically in an intermediate spaced position between inner and outer mold forms, substantially simultaneously filling the inner and outer spaces between said core and respective mold forms with molten asphaltic material in direct contact with said core and substantially simultaneously cooling the inner and outer asphaltic bodies by spraying cold water against said mold forms.

JOHN K. MacKINNON.